(12) United States Patent
Noh

(10) Patent No.: US 6,404,457 B1
(45) Date of Patent: Jun. 11, 2002

(54) DEVICE AND METHOD FOR CONTROLLING MOVIE CAMERA SHUTTER SPEED

(75) Inventor: Jae Kyeong Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/413,944

(22) Filed: Mar. 30, 1995

(30) Foreign Application Priority Data

Mar. 31, 1994 (KR) .............................................. 94-6790

(51) Int. Cl.⁷ .............................................. H04N 5/235
(52) U.S. Cl. ...................................... 348/362; 396/245
(58) Field of Search ................................ 348/207, 220, 348/221, 296, 362, 363, 364, 366, 374, 375; 396/245, 246, 247; H04N 5/238

(56) References Cited

U.S. PATENT DOCUMENTS

| | | | |
|---|---|---|---|
| 3,896,472 A | * 7/1975 | Yoshiyama et al. | 396/237 |
| 5,258,848 A | 11/1993 | Kondo et al. | 348/363 |
| 5,319,449 A | 6/1994 | Saito et al. | 348/226 |

* cited by examiner

*Primary Examiner*—Tuan Ho
(74) *Attorney, Agent, or Firm*—Birch, Stewart, Kolasch & Birch, LLP

(57) ABSTRACT

A movie camera provided with a shutter speed control system, which can control shutter speed appropriately under a low brightness in a manual speed mode. The shutter speed control system is limited to a usable range of shutter speed in response to the level of environmental illuminance detected by an iris opening detection means. The performance of undesired shutter speed modes caused by user selection is eliminated, resulting in clearer images upon reproduction of recordings.

9 Claims, 5 Drawing Sheets

DEVICE AND METHOD FOR CONTROLLING MOVIE CAMERA SHUTTER SPEED

BACKGROUND OF THE INVENTION

The present invention relates to a device and a method for controlling movie camera shutter speed, more particularly to a device and a method for controlling movie camera shutter speed, which can control shutter speed appropriately in a low brightness environment by making the camera sense the environmental brightness in a manual mode.

FIG. 1 is a block diagram showing the entire system of a conventional manual shutter speed control device.

As shown in FIG. 1, the shutter speed control device of a conventional art includes a function key part 1, a microcomputer 2, a timing signal generation part 3, a CCD(Charge coupled device) 4, and a signal processing part 5.

The function key part 1 selects the mode of shutter speed.

The microcomputer 2 determines a shutter speed mode in response to a signal received from the function key part 1, and applies the signal to the timing generation part 3.

The timing generation part 3 controls timing of CCD operation pulses in response to a signal received from the microcomputer 2.

The CCD 4 properly charges electricity therein according to the signal received from the timing generation part 3, and the signal processing part 5 generates video signals by processing the signals received from the CCD 4.

When a proper key of the function key part 1 is pressed in order to put the camera into a certain shutter speed mode, the microcomputer 2 determines a shutter speed mode in response to a signal received from the key, and applies appropriate control voltage to the timing generation part 3.

TABLE I shown below represents the relationship between the shutter speed control voltage(SSC) and the shutter speed mode.

TABLE I

| MODE | SSC1 | SSC2 | SSC3 |
|---|---|---|---|
| 1/60 | L | L | L |
| 1/125 | L | L | H |
| 1/250 | L | H | L |
| 1/500 | L | H | H |
| 1/1000 | H | L | L |
| 1/2000 | H | L | H |
| 1/4000 | H | H | L |
| 1/10000 | H | H | H |

The control signal SSC1, SSC2 and SSC3 applied to the timing generation part 3 from the microcomputer 2 control timing signal generation so that a charging period of time of electricity in the CCD 4 can be appropriately controlled.

The timing signals from the timing generation part 3 control the CCD 4, and the signals from the CCD 4 are applied through the signal processing part 5.

However, the conventional shutter control device has problems in that it has to be operated in an exclusive manual mode in case it is in a manual mode, and, in case of retrieving to a normal mode, it should be retrieved into the normal mode, not by instant shifting of the mode, but by proceeding through each step of modes from the low brightness mode to the normal mode.

In other words, in case of shifting back into a normal mode from shooting an object at a shutter speed mode of $1/500$ sec. mode, it should go through the modes of $1/1000$ sec., $1/2000$ sec., $1/4000$ sec. and $1/10000$ sec. until it completely retrieves back to a normal mode, which inevitably makes viewers watch an undesired quality of pictures since pictures taken going through the above modes from a low brightness mode are made extremely dark and unrefined.

FIG. 2 is a block diagram showing entire system of a conventional automatic shutter speed controlling device.

As shown in FIG. 2, the conventional automatic shutter speed control device includes a lens part 6, a hole voltage detection part 7, a hole voltage amplification part 8, a hole voltage offset part 9, an ASC operation part 10, a microcomputer 11, a timing signal generation part 12, a CCD 13, a signal processing part 14, a reference voltage generation part 15 and an ASC key part 16.

The lens part 6 includes many lenses and the hole voltage detection part 7 connected to the lens part 6 for detecting hole voltage with sensing an extent of opening of an iris.

The hole voltage amplification part 8 amplifies weak voltage received from the hole voltage detection part 7 enough to perform ASC at the ASC operation part 10.

The reference voltage generation part 15 generates a reference voltage for operating the hole voltage detection part 7 and the ASC operation part 10.

The ASC operation part 10 generates a control voltage for converting the shutter speed mode in response to the signals received from the hole voltage amplification part 8, the hole voltage offset part 9, and the reference voltage generation part 15.

The hole voltage offset part 9 determines an offset of the hole voltage.

The microcomputer 11 generates a control voltage for controlling shutter speed in response to the signals received from the ASC operation part 10 and the ASC key part 16.

The timing signal generation part 12 generates timing signals in response to signals received from the microcomputer 11.

The CCD 13 converts signals received from the timing signal generation part 12 into electrical signals and the signal processing part 14 processes signals received from the CCD 13.

The reference voltage for operation received from the reference voltage generation part 15 is applied to the hole voltage detection part 7 and the ASC operation part 10.

In response to the reference voltage received from the reference voltage generation part 15, the hole voltage detection part 7 connected to the lens part 6 detects a hole voltage with an extent of opening of the iris sensed.

The hole voltage from the hole voltage detection part 7 is, amplified at the hole voltage amplification part 8, and applied to the ASC operation part 10.

Signals from the hole voltage amplification part 8, the reference voltage generation part 15 and the hole voltage offset part 9 are applied to the ASC operation part 10 for generating a control voltage for controlling shifting of the shutter speed mode.

Voltage from the ASC operation part 10 is applied to the microcomputer 11 for generating a control voltage for controlling the shutter speed.

In other words, since the iris contracts when the environmental illumination becomes brighter, causing the ASC operation part 10 to output a higher voltage, a control voltage value which leads to a higher shutter speed mode is generated at the microcomputer 11.

And, since the iris expands when the environmental illumination becomes darker, causing the ASC operation part 10 to output a lower voltage, a control voltage value which leads to a lower shutter speed mode is generated at the microcomputer 11.

For example, the shutter speed changes from $1/125$ sec. to $1/250$ sec., or from $1/250$ sec. to $1/125$ sec, respectively.

FIG. 3 shows the hysterisis characteristic in camera iris and FIG. 4 shows ASC changes according to brightness.

However, since the conventional automatic shutter speed control device accompanies hysterisis according to the operation voltages in opening and closing movement of the iris as shown in FIG. 3, and with deviation between sets, detection of an extent of iris opening from the operation voltage can not be corrected.

And, as shown in FIG. 4, since the ASC function can only be performed by detecting the extent of a permanent opening of the iris, it is hard to perform an accurate ASC function.

Therefore, since the conventional automatic shutter speed control device is only able of operating with two or three modes, such as $1/125$ sec., $1/250$ sec., $1/500$ sec. or $1/125$ sec., $1/250$ sec., respectively, it has problems in that the shutter speed of a movie camera can not be controlled properly and accurately according to the environmental brightness.

SUMMARY OF THE INVENTION

The object of the present invention is to eliminate the foregoing problems by providing a device and a method for controlling movie camera shutter speed, which can provide clearer images on reproduction of the recording by limiting a shutter speed mode in a low brightness with a perceived brightness at performing a manual mode.

Other object of the present invention is to provide a device and a method for controlling movie camera shutter speed, which can control the shutter speed of a movie camera better and more accurately according to the changes of environmental brightness by varying the shutter speed modes more than the conventional device.

These and other objects and features of the present invention can be achieved by providing a device for controlling movie camera shutter speed, including a lens means for shooting objects, an iris opening extent detection means connected to the lens means for detecting the extent of opening of an iris, a manual shutter speed performing means for performing a manual shutter speed mode, an adjusting signal generation means for generating a signal for adjusting a manual shutter speed on comparison of a signal from the iris opening extent detection means to a preset reference signal, and a microcomputer for determining shutter speed value by using signals received from the manual shutter speed performing key means and the adjusting signal generation means.

DETAILED DESCRIPTION OF THE PREFERRED EMBODIMENTS

One embodiment of the present invention is to be explained hereinafter in detail, referring to the attached drawings.

Figure 1:
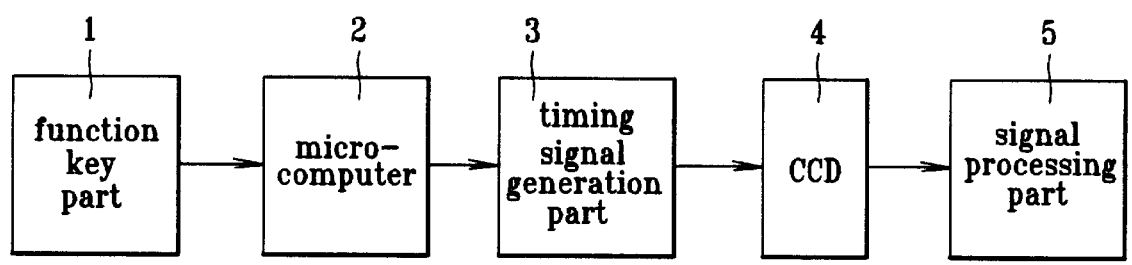
FIG. 1 is a block diagram showing the entire system of a conventional manual shutter speed control device.
Figure 2:
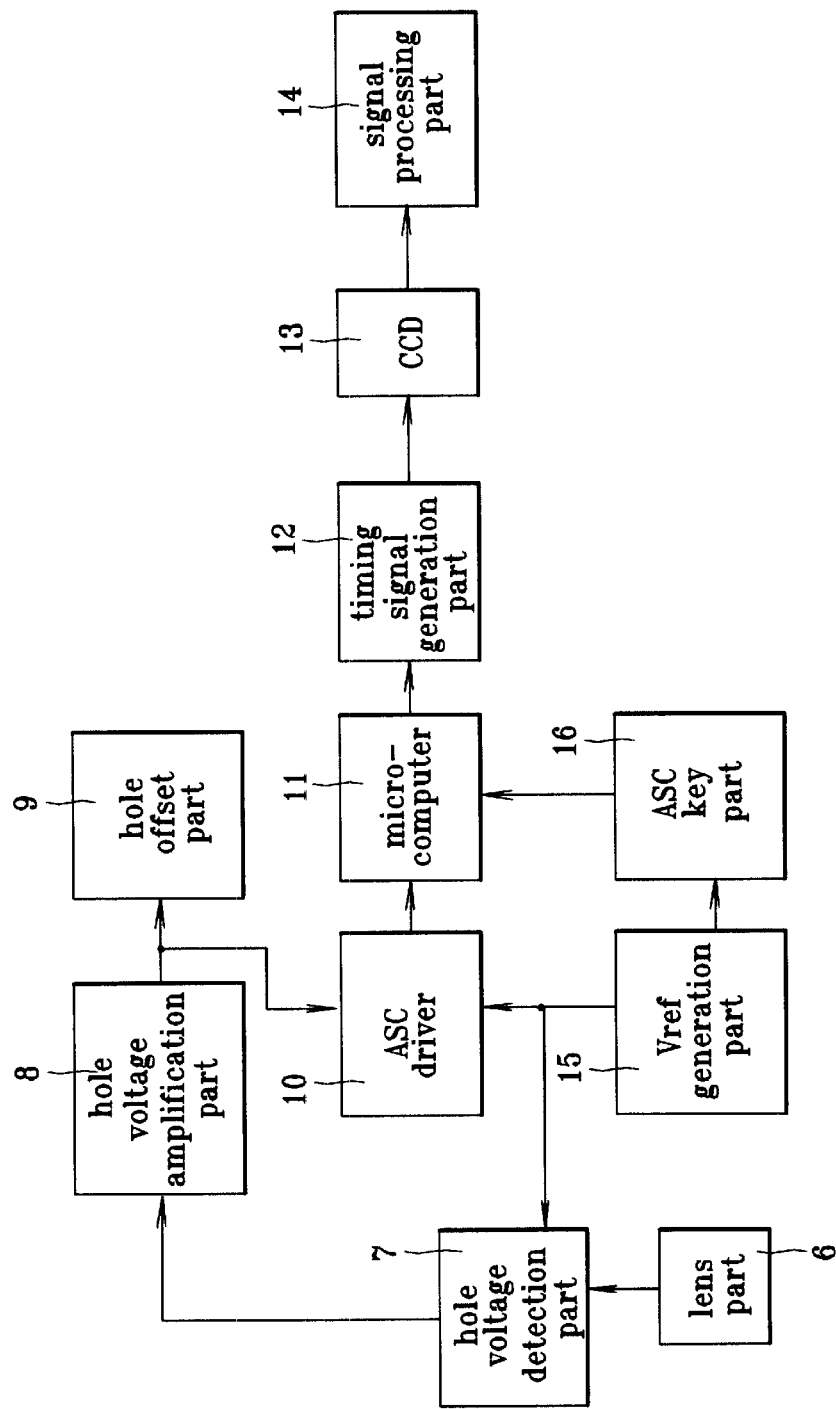
FIG. 2 is a block diagram showing the entire system of a conventional automatic shutter speed control device.
Figure 3:
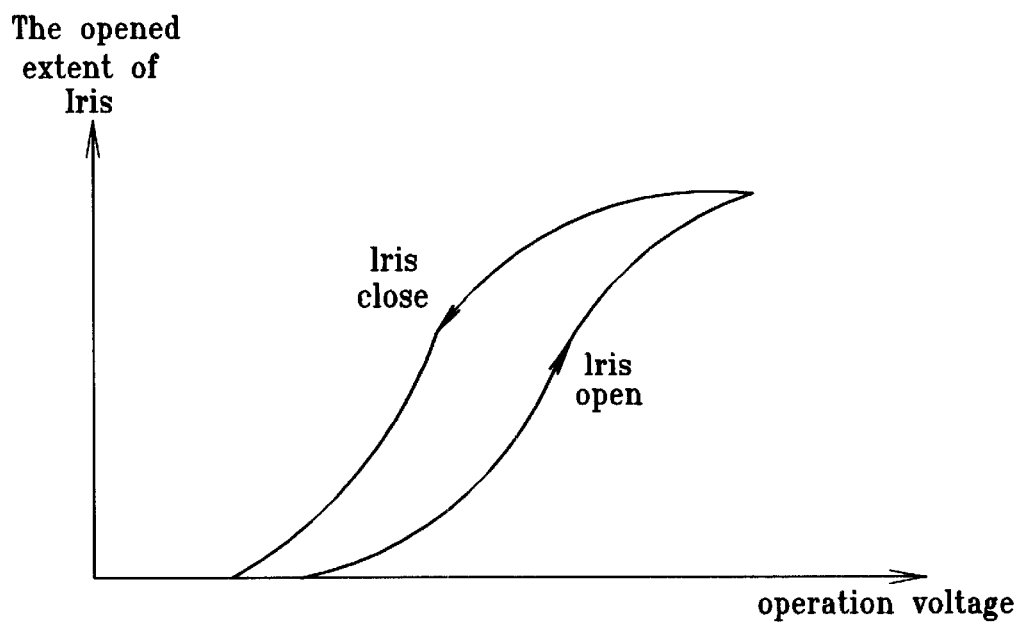
FIG. 3 illustrates character of iris hysterisis.
Figure 4:
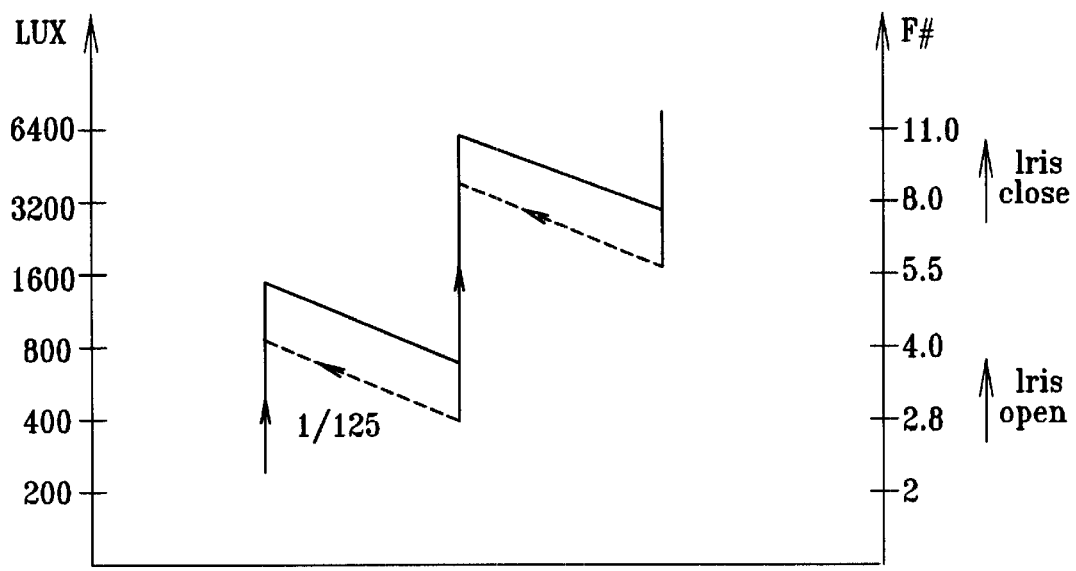
FIG. 4 illustrates the change of ASC according to the brightness.
Figure 5:
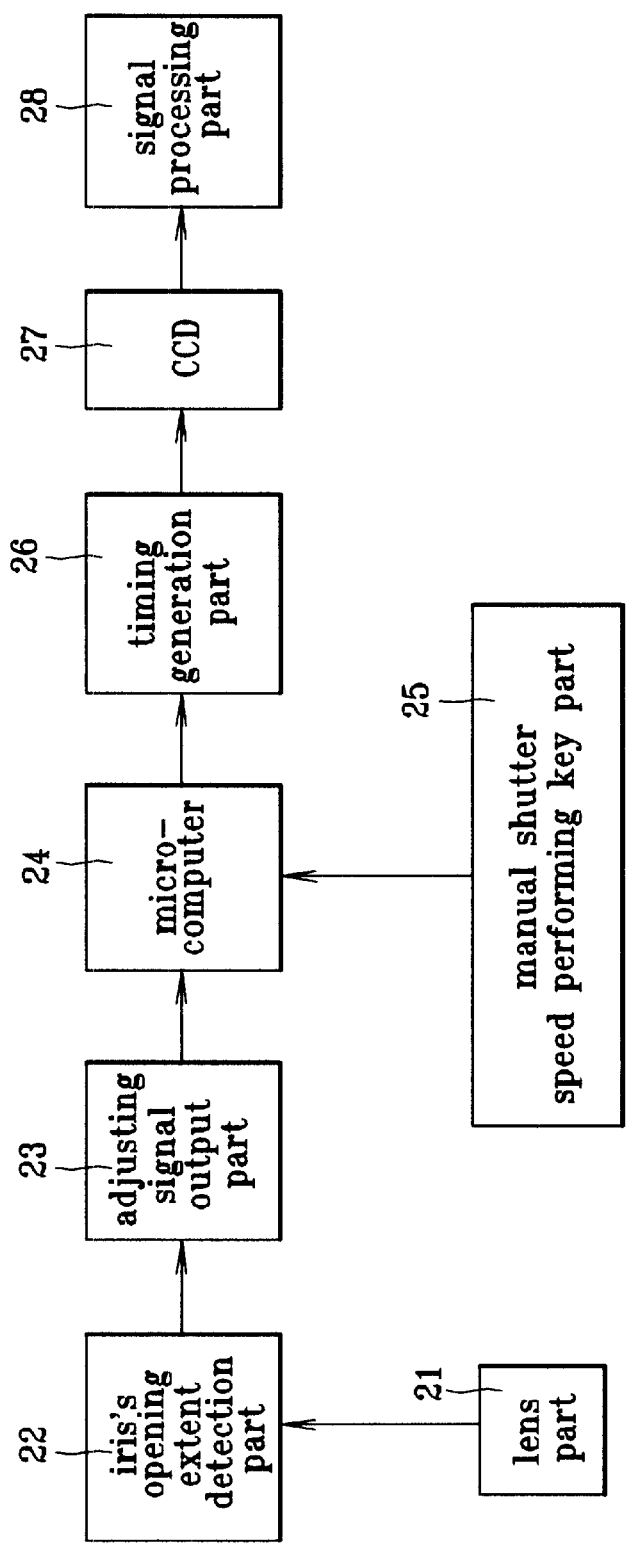
FIG. 5 is a block diagram showing the entire system of a shutter speed control device in accordance with the present invention.

FIG. 5 is a block diagram showing the entire system of a shutter speed control device in accordance with the present invention.

As shown in FIG. 5, the shutter speed control device according to the present invention includes a lens part 21, an iris opening extent detection part 22, an adjusting signal generation part 23, a microcomputer 24, a manual shutter speed performing key part 25, a timing signal generation part 26, a CCD 27, and a signal processing part 28.

The lens part 21 shoots an object and the iris opening extent detection part 22 connected to the lens part 21 detects the extent of iris opening.

The adjusting signal generation part 23 generates a voltage for performing a manual shutter speed mode based on a signal received from the iris opening extent detection part 22.

The manual shutter speed performing key part 25 is used by the user to set the manual shutter speed mode.

The microcomputer 24, actuated by a signal from the manual shutter speed performing key part 25, determines a range for the shutter speed mode by using the voltage value received from the adjusting signal generation part 23.

The timing signal generation part 26 controls the timing of CCD operating pulses in response to a signal received from the microcomputer 24.

The CCD 27 is operated in response to a signal received from the time signal generation part 26, and the signal processing part 28 processes signals received from the CCD into video signals.

Operation of the present invention is to be explained hereinafter, referring to FIGS. 5 & 6.

The extent of the iris opening is detected at the iris opening extent detection part 22 connected to the lens part 21, and the detected voltage is applied to the adjusting signal generation part 23.

The voltage received from the iris opening extent detection part 22 is amplified and adjusted the offset at the adjusting signal generation part 23 and stored in the microcomputer 24.

The voltage received from the adjusting signal generation part 23 is determined by the category it belongs to and divided into three different areas by the microcomputer 24.

In other words, in case the environmental brightness is low with the output voltage value being lower than a first preset voltage A, on turning on a manual shutter speed mode switch, only a $1/125$ sec. mode is performed, and on turning off the manual shutter speed mode switch, it retrieves to, and performs a normal mode of $1/60$ sec. mode.

And, in case the environmental brightness is in the order of indoor brightness with the determined voltage value being higher than the first preset voltage A but lower than a second preset voltage B, on turning on the manual shutter speed mode switch, it retrieves through modes of $1/125 \rightarrow 1/250 \rightarrow 1/500 \rightarrow 1/1000$ to a normal mode and performs the normal mode of $1/60$ mode, and on turning off the manual shutter speed mode switch, it directly retrieves to, and performs a normal mode of $1/60$ sec. mode.

And, in case the environmental brightness is brighter than the indoor brightness with the determined voltage value being higher than the third preset voltage C, on turning on the manual shutter speed mode switch, it retrieves through modes of $1/1000 \rightarrow 1/2000 \rightarrow 1/4000 \rightarrow 1/10000$ to a normal mode and performs the normal mode of $1/60$ mode, and on turning off the manual shutter speed mode switch, it directly retrieves to, and performs a normal mode of $1/60$ sec. mode.

And, in case the voltage value is changed due to change of the brightness of the object during performing a shutter speed function, it is retrieved to an initial shutter speed mode corresponding to the changed voltage value.

Figure 6:
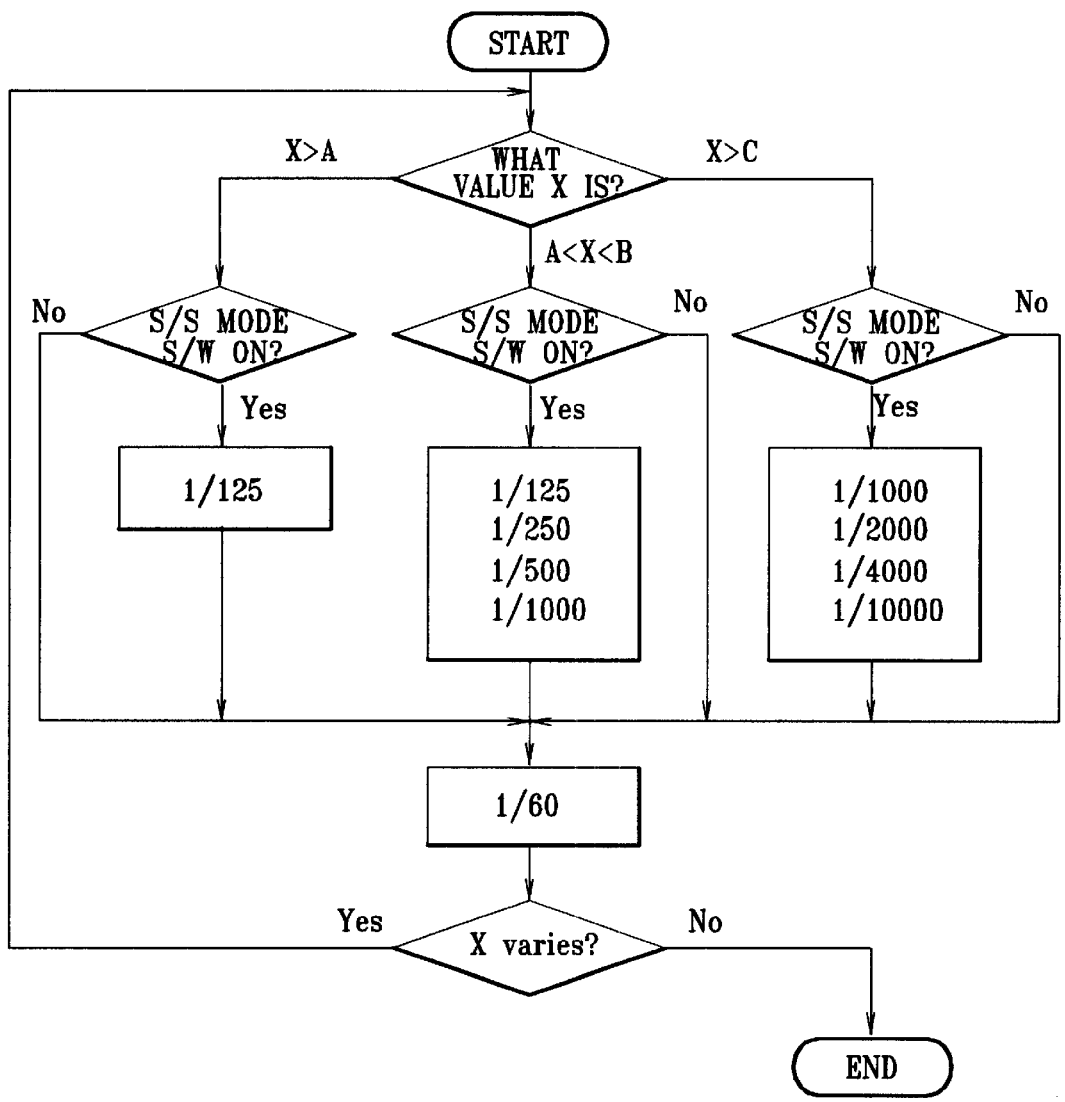
FIG. 6 illustrates a sequence of a method for controlling shutter speed in accordance with the present invention.

FIG. 6 illustrates a sequence of a method for controlling shutter speed in accordance with the present invention.

First, the output voltage X of the adjusting signal generation part 23 is determined and classified into a case when the environmental brightness is low with the determined voltage being lower than a first preset voltage A, a case when the environmental brightness is in the order of indoor brightness with the determined voltage value being higher than the first preset voltage A but lower than a second preset voltage B, and case when the environmental brightness is brighter than the indoor brightness with the determined voltage value being higher than the third preset voltage C.

In case the output voltage value X is lower than the first preset voltage A, the on/off position of the shutter speed mode switch that orders a change of a shutter speed mode is detected, and if the switch is found turned on for ordering change of the shutter speed mode, it performs an $1/125$ sec. mode, and retrieves to an $1/60$ sec. mode, and if the switch is found turned off, it directly retrieves to an $1/60$ sec. mode.

In case the output voltage value X is higher than the first preset voltage A but lower than a second preset voltage B, the on/off position of the shutter speed mode switch is detected, and if the switch is found turned on, it retrieves through modes of $1/125 \rightarrow 1/250 \rightarrow 1/500 \rightarrow 1/1000$ to a normal mode, and if the switch is found turned off, it directly retrieves to a normal mode of $1/60$ sec. mode.

In case the output voltage value X is higher than a third preset voltage C, the on/off position of the shutter speed mode switch is detected, and if the switch is found turned on, it retrieves through modes of $1/1000 \rightarrow 1/2000 \rightarrow 1/4000 \rightarrow 1/10000$ to $1/60$ sec. mode, and if the switch is found turned off, it directly retrieves to $1/60$ sec. mode.

After performing an $1/60$ sec. mode, change of the output voltage value X is detected. If the output voltage value X is found changed, it retrieves to a step for determining the output voltage value X, and if the output voltage value X is found not changed, the operation is finished.

Since the present invention having the system and method of operation explained above can eliminate performance of undesired shutter speed modes and can appropriately control a manual shutter speed according to change of the illuminance, it is possible to have clearer images with reproduction of recordings.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A device for controlling movie camera shutter speed comprising:

an iris opening detection means for sensing the extent of iris opening and generating a signal representative of the extent of iris opening;

an adjusting signal output means for detecting an environmental illuminance in response to the signal from the iris opening detection means; and a microcomputer for determining a limited usable range of shutter speed mode for performing a manual shutter speed in response to the signal received from the adjusting signal output means.

2. A method for controlling movie camera shutter speed comprising steps of:

determining the extent of iris opening;

detecting an environmental illuminance in response to the extent of iris opening; and determining a limited usable range of shutter speed according to the environmental illuminance in manual shutter speed mode.

3. The method as claimed in claim 2, wherein the step of determining a limited usable range of shutter speed includes determinations in, a case when the environmental illuminance is low, a case when the environmental illuminance is in the order of an indoor illuminance, and a case when the environmental illuminance is high.

4. The method as claimed in claim 3, wherein, in the case when the environmental illuminance is low, either a step of performing $1/125$ sec. mode on ordering a change of the shutter speed mode, or a step of proceeding to a normal mode on not ordering a change of the shutter speed mode, is performed.

5. The method as claimed in claim 4, wherein the normal mode is a $1/60$ sec. mode.

6. The method as claimed in claim 3, wherein, in the case when the environmental illuminance is in the order of an indoor illuminance, either a step of performing modes of $1/125$ sec., $1/250$ sec., $1/500$ sec., and $1/1000$ sec. on ordering a change of the shutter speed mode, or a step of proceeding to a normal mode on not ordering a change of the shutter speed mode, is performed.

7. The method as claimed in claim 6, wherein the normal mode is a $1/60$ sec. mode.

8. The method as claimed in claim 3, wherein, in the case when the environmental illuminance is high, either a step of performing modes of $1/1000$ sec., $1/2000$ sec., $1/4000$ sec., and $1/10000$ sec. on ordering a change of the shutter speed mode, or a step of proceeding to a normal mode on not ordering a change of the shutter speed mode is performed.

9. The method as claimed in claim 8, wherein the normal mode is a $1/60$ sec. mode.

* * * * *